United States Patent
Kalogeropulos et al.

(10) Patent No.: US 9,274,771 B1
(45) Date of Patent: Mar. 1, 2016

(54) AUTOMATED ADAPTIVE COMPILER OPTIMIZATION

(71) Applicant: ORACLE INTERNATIONAL CORPORATION, Redwood City, CA (US)

(72) Inventors: Spiros Kalogeropulos, Los Gatos, CA (US); Partha Tirumalai, Fremont, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/492,743

(22) Filed: Sep. 22, 2014

(51) Int. Cl.
*G06F 9/45* (2006.01)

(52) U.S. Cl.
CPC .................................... *G06F 8/443* (2013.01)

(58) Field of Classification Search
CPC ........................................................ G06F 8/443
USPC ................................................. 717/136–167
See application file for complete search history.

(56) References Cited

U.S. PATENT DOCUMENTS

| | | | |
|---|---|---|---|
| 5,613,117 A * | 3/1997 | Davidson et al. | 717/144 |
| 6,598,221 B1 * | 7/2003 | Pegatoquet et al. | 717/152 |
| 7,181,735 B1 * | 2/2007 | Haraguchi et al. | 717/151 |
| 2003/0093780 A1 * | 5/2003 | Freudenberger et al. | 717/153 |
| 2008/0034357 A1 * | 2/2008 | Gschwind | 717/149 |

OTHER PUBLICATIONS

Keutzer, Kurt. "DAGON: technology binding and local optimization by DAG matching." Papers on Twenty-five years of electronic design automation. ACM, 1988, pp. 617-623.*
Burke, Michael G., et al. "The Jalapeno dynamic optimizing compiler for Java." Proceedings of the ACM 1999 conference on Java Grande. ACM, 1999, pp. 129-141.*
Hayes-Roth, Frederick. "Rule-based systems." Communications of the ACM 28.9 (1985, pp. 921-932.*

* cited by examiner

*Primary Examiner* — Satish Rampuria
(74) *Attorney, Agent, or Firm* — Marsh Fischmann & Breyfogle LLP; Daniel J. Sherwinter

(57) ABSTRACT

Embodiments of the invention provide systems and methods for automatically and adaptively optimizing compilation of application code using a rule-based optimization analyzer (RUBOA) that can command a compiler to apply and adapt optimizations at the code segment level according to gathered performance data. For example, source code can be canonically compiled, and annotations can associate compiled code sections with source code sections. The generated binary can then be executed and monitored to gather performance characteristics. The RUBOA can apply the gathered performance characteristics and annotations to a pre-defined rule set to generate compiler optimizations, each associated with and parametrically tailored to respective source code segments. The RUBOA can automatically generate optimization control data from the generated compiler optimizations, and the source application code can be re-compiled according to the set of optimization control data to generate executable code that is adaptively optimized at the code segment level.

15 Claims, 4 Drawing Sheets

AUTOMATED ADAPTIVE COMPILER OPTIMIZATION

FIELD

Embodiments of the present invention relate generally to compilers, and, more particularly, to rule-based automation of compiler optimization.

BACKGROUND

The development of software applications typically involves writing software code in a high-level programming language and translating the code into a lower-level machine language that can be executed by a computer system. Many so-called "compiler" applications exist to effectuate the translation from the high-level "source code" into a lower-level "executable code." These compilers may implement many different types of functionality, for example, that enhance the efficiency of the compilation process through various compiler optimizations.

Advanced compilers can implement hundreds of optimizations that have been developed over the past few decades. However, compilers typically only apply a subset of available optimizations, and the optimizations are typically applied somewhat indiscriminately on every function or block in the file (e.g., according to fixed command line options). This can result in sub-optimal performance, for example, from incorrectly applying speculative optimizations to functions that do not need them, from applying non-speculative optimizations in a "one-size-fits-all" manner, etc. Furthermore, many speculative optimizations are often shunned during compilation, as it may be difficult for the user to instruct the compiler to perform speculative optimizations only to selected functions in a file.

BRIEF SUMMARY

Among other things, systems and methods are described for automatically and adaptively optimizing compilation of application code using a rule-based compiler optimizer. Some implementations include a rule-based optimization analyzer (RUBOA) that can command a compiler to perform compiler optimizations in a manner that applies and adapts the optimizations at the code segment level according to performance data. For example, source application code can be compiled in a canonical manner, and annotations can be generated to associate sections of compiled code with sections of the source code. The generated binary can then be executed and monitored to gather performance characteristics. A RUBOA can utilize the gathered performance characteristics to apply a set of pre-defined set of associations between conditions and actions to generate a set of specifically tailored compiler optimizations, each associated with a specific code segment from the source code according to the annotations generated during the canonical compile. The RUBOA can automatically generate a set of optimization control data from the generated set of compiler optimizations, and their respective parameters and source code segment associations. The source application code can then be recompiled according to the set of optimization control data to generate executable code that is adaptively optimized at the code segment level.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
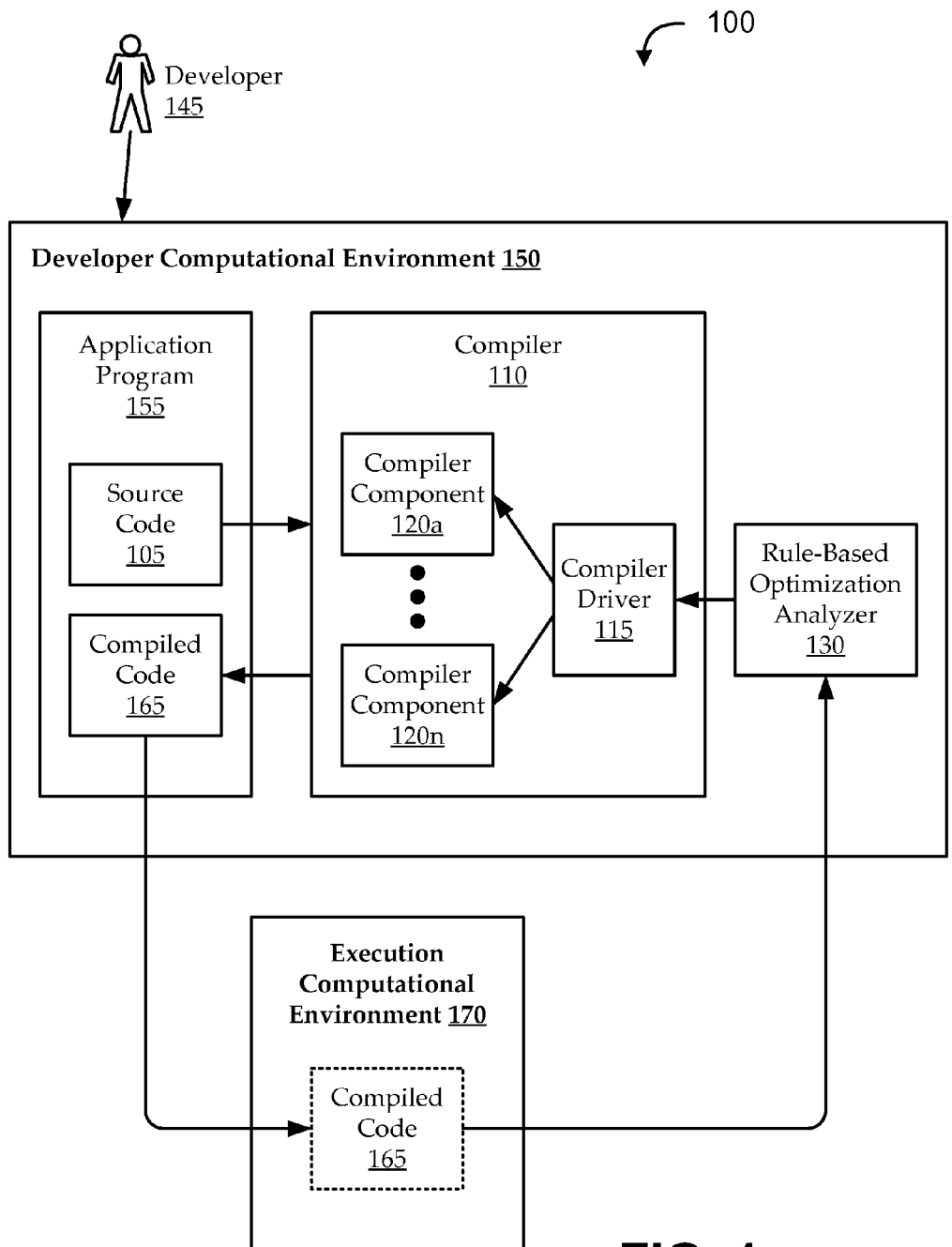
FIG. 1 shows a typical software development environment to provide a context for various embodiments.

Turning first to FIG. 1, a typical software application development environment 100 is shown to provide a context for various embodiments. For the sake of clarity, the application development environment 100 is broken generally into a developer computational environment 150 and an execution computational environment 170. These computational environments can be part of a single computational environment (e.g., implemented on a single computer) or distributed among multiple computational environments. For example, the developer computational environment 150 can be optimized for compiling large applications and can exploit features, such as multi-core and/or parallel processing, resource off-loading (e.g., using cloud-based resources), etc.; and the execution computational environment 170 can be an end-user computer, a development computer configured to manifest expected features of an end-user computer, etc.

As illustrated, the developer computational environment 150 can include a compiler 110 and an application program 155 (i.e., the target application to be compiled). The compiler 110 can generally translate un-compiled "source" code 105 into compiled "executable" code 165 by using a number of compiler components 120, each configured to apply certain compiler 110 functionality to certain types of code. The compiler components 120 can include various compiler optimizations, such as methods for unrolling loops, parallelizing code segment execution, etc. The compiler 110 can also include a compiler driver 115 (e.g., that may technically be implemented as one of the compiler components 120, but is separated out for the sake of clarity) that can control operation of some or all of the other compiler components 120. Each "compiler component 120" can be a sub-component of another compiler component 120 or can include one or more sub-components.

The compiler 110 runs on a developer computational environment 150 (e.g., a personal computer or other computing platform) to compile source code 105 of the application program 155 into compiled code 165 (e.g., an executable binary) of the application program 155. A developer 145 (e.g., a software programmer) may develop the source code 105 by writing and debugging code segments in a high-level programming or scripting language, like "Java," "C," "PHP," "Visual Basic," "Perl," etc. The developer 145 can then send the source code 105 to the compiler 110 (e.g., which may or may not be stored locally on the developer computational environment 150), and the compiler 110 can translate the source code 105 to compiled code 165 using its various compiler components 120 as controlled by the compiler driver 115.

Typically, advanced compilers 110 can implement hundreds of optimizations that have been developed over the past few decades. Typically, compilers 110 apply a subset of the available optimizations, for example, as indicated by command line options, to all the code in input source files (associated with and/or including the source code 105). Such available compiler optimizations can be generally classified into speculative optimizations and non-speculative optimizations. Speculative optimizations (e.g., prefetch generation for direct or indirect memory accesses) can contribute to performance improvement, so long as benefits obtained from the optimized code outweigh any run time costs of the speculation. Non-speculative optimizations are generally beneficial, but can be "tuned" with parameters for maximum benefit. For example, loop unrolling can often be classified as non-speculative, but the extent of the unrolling can be a parameter that can impact the benefit of the optimization.

In typical compilers 110, optimizations are applied somewhat indiscriminately on every function or block in source code 105 file (e.g., according to fixed command line options). This can result in sub-optimal performance, for example, from incorrectly applying speculative optimizations to functions that do not need them, from applying non-speculative optimizations in a "one-size-fits-all" manner, etc. Furthermore, many speculative optimizations are often shunned during compilation, as it may be difficult for the developer 145 to instruct the compiler 110 to perform speculative optimizations only to selected functions in a source code 105 file.

A number of traditional approaches have been developed for deciding which optimizations to apply and/or which parameters to use with the applied optimizations. In one such approach, called "static analysis," the compiler 110 can analyze the source code 105 to decide whether and how to apply an optimization. For example, if the compiler 110 encounters the code "for (i=0; i<10000000; i++) x[i]=y[i]+t*z[i]," the compiler 110 can decide whether and how to parallelize, unroll, use prefetch, etc. (e.g., because the code indicates a fairly standard type of loop with a relatively small number of instructions and a relatively large trip count). However, static analysis often fails, as the code does not often provide clear guidance as to which optimizations to apply. For example, if the above code were written as "for (i=0; i<n; i++) x[i]=y[i]+t*z[i]" (i.e., with an "n" instead of a "10000000"), the value of n may not be known to the compiler 110, and the compiler 110 may not be able to accurately determine whether and how to apply optimizations. In such instances, the compiler 110 may be left to guess or introduce "versioning." For example, the compiler 110 may create two or more versions of the loop, one for a small trip count case and another for a large trip count case, which may add complexity and run time cost to select the appropriate version at runtime.

Another traditional approach involves adding so-called "command line options" to control the applied compiler optimizations. The command line options permit a developer 145 to select the exact options to apply (assuming the compiler provides command line options for every possible optimization) to each function or code fragment. Usually, most compilers 110 implement internal options for detailed control (e.g., primarily for debugging purposes), but such internal options are not typically made available to external developers 145. Using either type of option is typically impractical, as it would be tedious, inconvenient, and error-prone to specify every option and parameter for each function or block in the source code. Further, the source code 105 programmers typically are not sufficiently familiar with the internal workings of the compiler 110 and/or of the target computational environment (e.g., the execution computational environment 170) to know which compiler optimizations to apply or in which ways.

Another traditional approach involves so-called "pragmas," or "directives." The pragmas or directives are typically added by the developer 145 to the source code 105 effectively as hints to the compiler 110. For example, a pragma can be inserted in the source code 105 before a particular type of loop or other code section that can invoke a certain type of compiler optimization. While these are often more useful to programmers than command line options (e.g., they are typically more intuitive and part of the source code programming language, as opposed to being part of the compiler command line), adding all the needed pragmas and directives can still be very tedious, and is typically impractical for large applications. Further, effective use of pragmas and directives still typically involve the application developer 145 learning about internal workings and options of the compiler 110.

Another traditional approach involves so-called "profile feedback," in which execution data are collected by the compiler 110 as the application is executed. The compiler 110 can then be re-invoked, and the collected data can be consulted by the compiler 110 to decide which optimizations to apply. There are typically at least two limitations to this approach. One limitation is that the execution data is typically collected with an instrumented binary that is produced by the compiler 110, and often contains very limited amounts and types of information. For example, the data often reflects only a profile of branch edges in the application program, and other detailed execution data is absent. Another limitation is that the compiler 110 typically operates in a "pull" mode, where each optimization individually queries the collected data and decides whether and how to apply the optimization. For example, exploiting the collected data involves modifying each optimization in the compiler to include additional instructions that allow the optimization to analyze the collected data and to modify its parameters accordingly. In practice, these modifications are often extensive, and mature compilers 110 generally only include such modifications in a small subset of the available optimizations, such that use of the collected data is limited.

Embodiments described herein include a novel rule-based optimization analyzer (RUBOA) 130 that can command the compiler 110 (e.g., the compiler driver 115) to perform appropriate optimizations with appropriate parameters for some or all code sections in the source code 105 (e.g., functions or other logical blocks of code). For example, the source code 105 can be canonically compiled by the compiler 110, and generated annotations can associate compiled code sections with source code sections. The generated binary can then be executed (e.g., by the execution computational environment 170) and monitored to gather performance characteristics. The RUBOA 130 can utilize the gathered performance characteristics and annotations to apply a pre-defined rule set to determine compiler optimizations, each associated with and parametrically tailored to respective source code segments. The RUBOA 130 can then automatically generate optimization control data from the selected compiler optimizations, and the source code 105 can be re-compiled (e.g., with the compiler 110) according to the set of optimization control data to generate executable compiled code 165 that is adaptively optimized at the code segment level.

Figure 2:
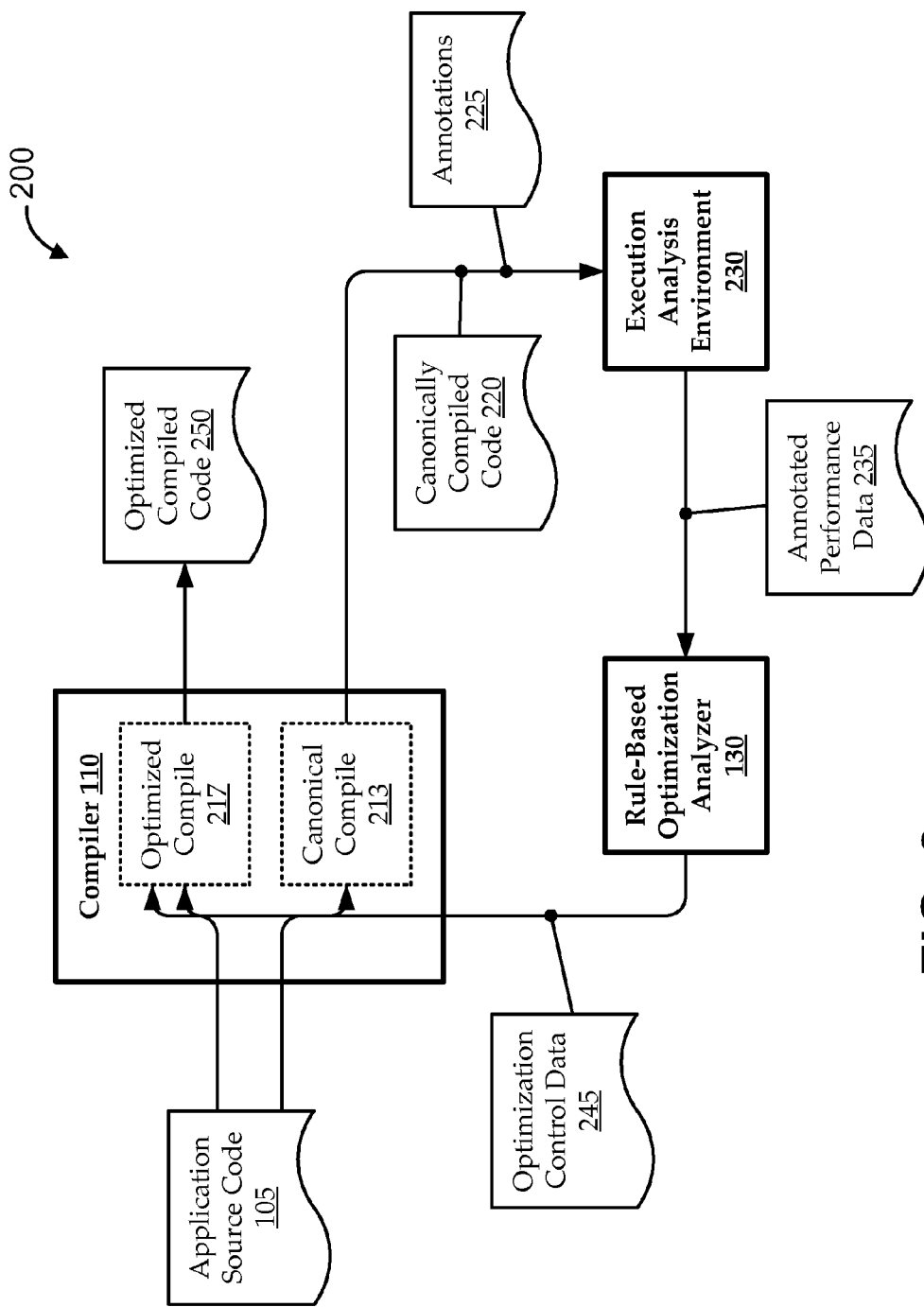
FIG. 2 shows a block diagram of portions of an illustrative rule-based optimized software application compiling environment, according to various embodiments.

FIG. 2 shows a block diagram of portions of an illustrative rule-based optimized software application compiling environment 200, according to various embodiments. The environment 200 includes a compiler 110, an execution analysis environment 230, and a rule-based optimization analyzer (RUBOA) 130. For the sake of clarity, various input and output data are shown. The compiler 110 and the RUBOA 130 can be implementations of the respective components of FIG. 1.

In some implementations, application source code 105 can be compiled in a canonical manner to generate canonically compiled code 220. For example, the compiler 110 (e.g., a static compiler) can include a set of instructions, which, when applied to the compiler driver (or in any other suitable manner), cause the compiler 110 to run a canonical compile 213. The canonical compile 213 can include disabling speculative optimizations, for example, by turning off functions, such as software prefetching. This can help "standardize" the generated executable (i.e., the canonically compiled code 220), which can make the analysis easier, as described below. For example, if software prefetching is included, the prefetches themselves can generate cache misses, some of which may be speculative and unnecessary, and those can cloud true misses from loads and stores (i.e., stemming from the source code 105 itself). The canonical compile can also include applying non-speculative optimizations with predetermined (e.g., default, or otherwise known) parameters. For example, any loop unrolling the compiler 110 decides to perform may be implemented with a parameter of '4.' As with disabling the speculative optimizations, applying the non-speculative optimizations in a more deterministic manner can help facilitate later interpretations of produced data. For example, if loops were unrolled by different amounts based on available heuristics inside the compiler 110, the performance may be better, but the data can become more difficult to analyze.

Annotations 225 can also be generated during the canonical compile 213 to associate sections of canonically compiled code 220 with sections of the source code 105. This can effectively generate a standardized set of binary code that facilitates tracking of source code 105 sections and applied optimizations. For example, the annotations 225 of the canonically compiled code 220 code can be produced (i.e., effectively maintained) in a separate "section" to keep the annotations 225 stored together with the canonically compiled code 220 can to better facilitate later analysis. In other implementations, the annotations 225 can be generated and/or stored in any suitable manner. For example, the annotations 225 can include marking loads as direct or indirect accesses, the level of indirection for indirect accesses, etc. Such information can appreciably reduce the amount of re-analysis during a later re-build (e.g., as part of the approach described below).

Some embodiments of the canonically compiled code 220 generated by the canonical compile 213 are not "instrumented" to produce data. Rather, the canonically compiled code 220 can be a normal binary, except that the optimizations are applied in a known, canonical manner, and annotations 225 are generated in a manner that can be used by later analysis (e.g., and saved in a separate section). Accordingly, the canonically compiled code 220 can run relatively fast, in comparison to typical instrumented binaries, which are often slow.

In some embodiments, the canonically compiled code 220 and the annotations 225 (e.g., as one or more files) can be provided to the execution analysis environment 230. The execution analysis environment 230 can be implemented as any suitable execution analysis tool (e.g., Oracle Solaris Studio Performance Analyzer), and can be run, for example, on the execution computational environment 170 of FIG. 1 or in any other suitable environment. As the canonically compiled code 220 is executed by the execution analysis environment 230, the execution can be monitored to gather performance characteristics. For example, the performance characteristics can include detailed sampling data relating to execution and/or other statistics (e.g., numbers of cache misses, etc.) by using hardware performance counters and/or other suitable techniques. The execution analysis environment 230 can be invoked with a targeted set of performance characteristics to collect. Embodiments of the execution analysis environment 230 can generate a data repository of the performance characteristics, which, along with the annotations 225, can effectively provide a set of annotated performance data 235. The annotated performance data 235 can, for example, indicate which code segments of the source code 105 result in which types of performance data.

In some embodiments, the annotated performance data 235 can be sent to the RUBOA 130 for analysis. Some implementations of the annotated performance data 235 are stored in a dedicated format that facilitates analysis of the data by the RUBOA 130. Embodiments of the RUBOA 130 can include a pre-defined set of associations between conditions and actions, such that the annotated performance data 235 can be used to generate a set of specifically tailored (e.g., selected and parametrically optimized) compiler optimizations, and each selected optimization can be associated with a specific code segment from the source code 105, according to the annotations 225 generated during the canonical compile 213. The RUBOA can automatically generate a set of optimization control data from the generated set of compiler optimizations, and their respective parameters and source code segment associations.

For example, the RUBOA's 130 analysis of the annotated performance data 235 can determine an instance in which a particular code segment from the source code 105, compiled under the canonical compile 213 parameters, results in cache misses. The RUBOA 130 can then identify an associated rule that corresponds to the determined execution characteristic, and can generate a command (e.g., optimization control data) for a particular compiler optimization (e.g. cache blocking with tile size of 8 kilobytes) associated with the identified rule to be applied to the particular code segment of the source code 105.

For the sake of further illustration, optimizations, such as loop transformations, tend to have a high cost due to appreciable variety, phase ordering, dependence analysis, and/or other parameters involved in applying them. Similarly, inlining typically has a high cost in its generated code size and, if applied extravagantly, can result in excessive I-cache misses. Such optimizations are often best applied to particular types of code segments, such as "hot call sites" or "loop nests." In some implementations, the RUBOA 130 can use time and/or tick counter profiles to drive these and/or other optimizations. For example, code segments (e.g., blocks) can be sorted by execution time (e.g., according to gathered annotated performance data 235), and regions that are in the top 25% (e.g., or any other suitable threshold) can be targeted for particular optimizations.

As another example, software prefetching is an optimization that targets cache misses. Because only a small number of loads and stores typically miss the cache (hit rates are often well over 90%), it can be difficult to find appropriate locations to apply this optimization. Implementations of the RUBOA 130 can use cache miss data (e.g., according to annotated performance data 235, for example, relating to cache misses in the largest on-chip cache, or any other suitable cache misses) to decide into which code regions to insert software prefetches. In some implementations, the annotations 225 can indicate whether direct or indirect prefetching is appropriate, and the RUBOA 130 can activate the most appropriate type of prefetching for regions with high cache miss rates.

As yet another example, trace scheduling and if-conversion are optimizations that attempt to reduce branch mispredict penalties. These penalties can be relatively high, for example, in deeply pipelined, high clock-rate systems. Trace scheduling tends to works best for branches that are highly skewed to one direction, while if-conversion tends to works best for branches that are substantially unskewed (e.g., nearly 50%-50% with respect to taken/not taken). Implementations of the RUBOA 130 can analyze branch mispredict data (e.g., according to the annotated performance data 235) to decide whether a code segment should be incorporated into a trace or if-converted.

As even another example, software pipelining can provide appreciable performance benefits for loops, but typically only when there is a certain minimum number of loop iterations (e.g., a minimum trip count). Implementations of the RUBOA 130 can analyze loop trip count data (e.g., according to the annotated performance data 235) to decide whether to apply software pipelining on a particular loop. As still another example, at a whole program level, implementations of the RUBOA 130 can analyze Translation Lookaside Buffer (TLB) miss data (e.g., according to the annotated performance data 235) to decide which page size should be requested for heaps and stacks.

The examples provided above are intended only to provide added clarity, and are not intended to limit the types of annotated performance data 235 that can be collected or the types of rules or analyses that can be performed by implementations of the RUBOA 130. Some implementations of the RUBOA 130 are designed so that new rules can be easily added, as needed. When the RUBOA 130 analyzes the annotated performance data 235 and applies its rules, it can generate a set of optimization control data 245. The optimization control data 245 can include a set of directives for instructing the compiler 110 as to which optimizations to perform on which particular code segments of the source code 105 and with which parameters. The optimization control data 245 can be output in any suitable format. For example, some implementations output the optimization control data 245 as a set of internal compiler options that may or may not be readable by (e.g., or even accessible to) the application developer. Some other implementations output the optimization control data 245 as a set of command line options, as a set of pragmas or directives, or in any other suitable manner or combination thereof. For example, the optimization control data 245 can indicate compiler directives, such as: "inline the calls at lines 127, 243, 257, 289"; "unroll the loop at line 506 by 4, at line 1001 by 7"; "add direct prefetches to the accesses at line 133"; "add indirect prefetches to the accesses at line 1203"; etc.

In some embodiments, the optimization control data 245 is used to direct operation of the compiler 110 to re-compile the source code 105 into optimized compiled code 250. For example, the compiler 110 can execute an optimized compile 217 function under the direction of the optimization control data 245. For example, embodiments of the RUBOA 130 can control the compile driver of the compiler 110. The compiler executing the optimized compile 217 can be the same as or different from the compiler that performed the canonical compile 213. For example, the optimized compile 217 can be implemented as a modification to the canonical compile 213 in accordance with the optimization control data 245. Directing compilation using the optimization control data 245 can permit the compiler 110 to output executable application code (e.g., an executable binary file) that is adaptively optimized at the code segment level.

One feature of the novel rule-based automated adaptive compiler optimization is that it permits a fine degree of control. For example, the effect can be similar to that of a very long and detailed command line option, but without the need for a programmer to understand the internal workings of the compiler, with potentially more capability (e.g., where internal compiler commands are more powerful than those command line options provided to developers), less error-prone (e.g., as they are generated automatically based on actual performance data, and not based on manual entry and supposition), etc. Another feature is that some implementations can exploit a wealth of execution data collected by already available performance analysis tools. Yet another feature is that some implementations involve minimal modifications to the compiler optimizations (e.g., as with typical profile feedback approaches, or the like), as the types of exploited internal compiler options are generally already available for debugging by compiler developers (or the exploited command line options, or the like, are typically already available to application developers). Still another feature is that the automated nature of the rule-based optimization analysis can mitigate, or even obviate, any need for the application developer to understand internal compiler optimization details.

Figure 3:
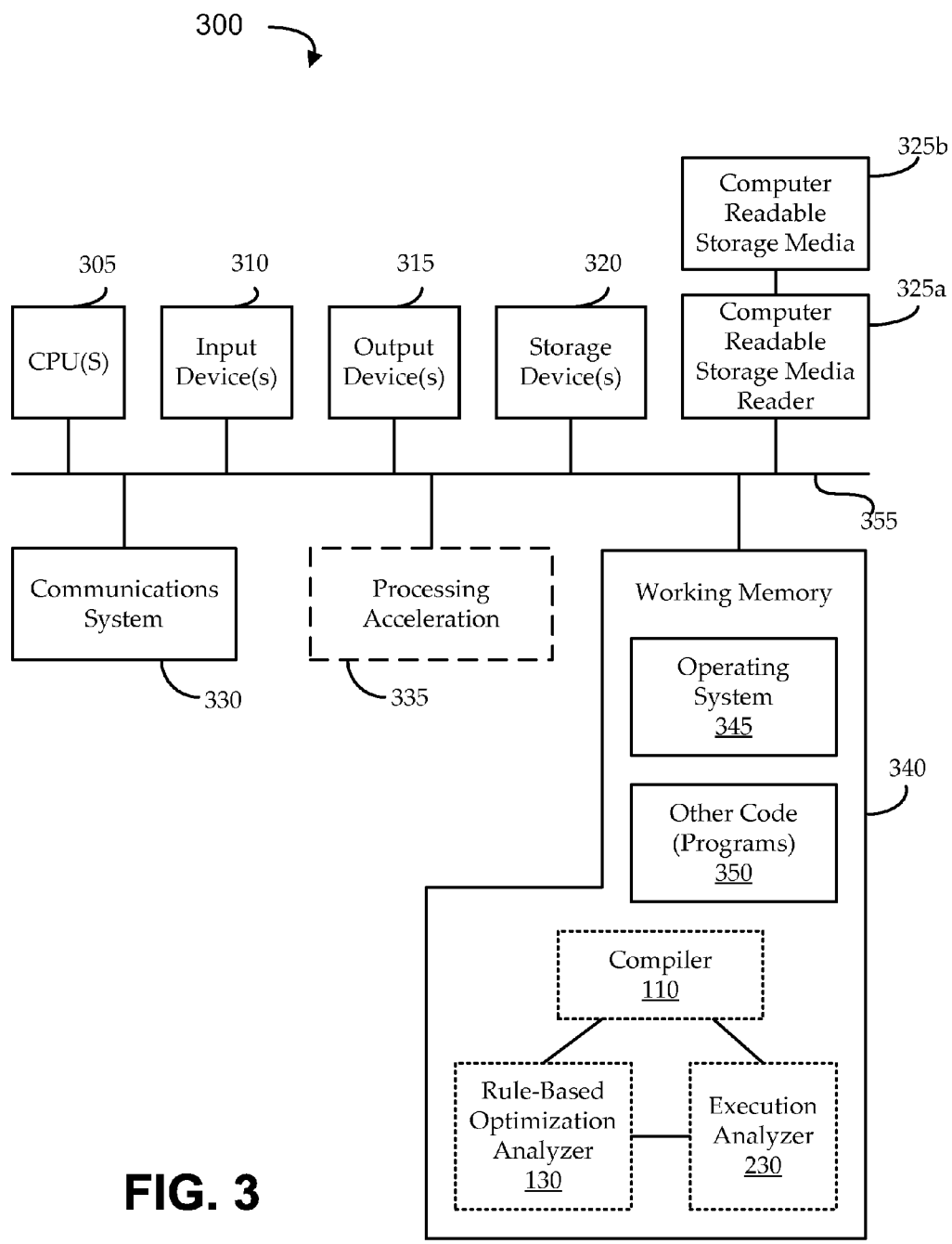
FIG. 3 shows an exemplary computational environment, in the context of which various embodiments may be implemented.

Various functionality described above can be implemented in one or more computational environments, such as developer computational environment 150 and/or execution computational environment 170 of FIG. 1. FIG. 3 shows an exemplary computational environment 300, in the context of which various embodiments may be implemented. The computational environment 300 may be implemented as or embodied in single or distributed computer systems, or in any other useful way. The computational environment 300 is shown including hardware elements that may be electrically coupled via a bus 355.

The hardware elements may include one or more central processing units (CPUs) 305, one or more input devices 310 (e.g., a mouse, a keyboard, etc.), and one or more output devices 315 (e.g., a display device, a printer, etc.). The computational environment 300 may also include one or more storage devices 320. By way of example, storage device(s) 320 may be disk drives, optical storage devices, solid-state storage device such as a random access memory (RAM) and/or a read-only memory (ROM), which can be programmable, flash-updateable and/or the like.

The computational environment 300 may additionally include a computer-readable storage media reader 325a, a communications system 330 (e.g., a modem, a network card (wireless or wired), an infra-red communication device, etc.), and working memory 340, which may include RAM and ROM devices as described above. In some embodiments, the computational environment 300 may also include a processing acceleration unit 335, which can include a DSP, a special-purpose processor and/or the like.

The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with a network and/or any other computer described above with respect to the computational environment 300.

The computational environment 300 may also include software elements, shown as being currently located within a working memory 340, including an operating system 345 and/or other code 350, such as an application program (which may be a client application, web browser, mid-tier application, RDBMS, etc.). For example, embodiments can be implemented as instructions, which, when executed by one or more processors 305, cause the processors 305 to perform certain functions. Such functions can include functionality of a compiler 110, an execution analyzer 230, and or a rule-based optimization analyzer (RUBOA) 130, such as those described above with reference to FIGS. 1 and 2.

For example, embodiments of the compiler 110 may interact with an application program as code 350 loaded into working memory 340. The compiler 110 can be a set of programs for translating source code into executable code (e.g., compiled code 165 of FIG. 1). Software source code can typically be written by a developer in a high-level language such as C, C++, Fortran, or other, and stored on a computer readable medium (e.g., storage device(s) 320 or computer readable storage medium 325*b*). The compiler 110 can compile the source code according to a set of components (e.g., optimizations, etc.), which can be directed, according to embodiments described above, by the RUBOA 130.

In some implementations, the source code can be compiled in a canonical manner by the compiler 110 (e.g., with speculative optimizations disabled, and non-speculative optimizations applied using predetermined parameters). Annotations can be applied during the canonical compile to associate sections of compiled code with sections of the source code to effectively generate a standardized set of binary code that facilitates tracking of source code sections and applied optimizations. The generated binary can then be executed, and the execution can be monitored (e.g., by the execution analysis environment 230, which may or may not be part of the same computational system 300) to gather performance characteristics of the executable program. The RUBOA 130 can include a pre-defined set of associations between conditions and actions, such that the gathered performance characteristics can be used to generate a set of specifically tailored (e.g., selected and parametrically optimized) compiler optimizations, and each generated optimization can be associated with a specific code segment from the source code, according to the annotations generated during the canonical compile. The RUBOA 130 can thus automatically generate a set of optimization control data from the generated set of compiler optimizations, and their respective parameters and source code segment associations. The source application code can then be compiled again (e.g., by the same compiler 110) according to the set of optimization control data. For example, the RUBOA 130 can effectively direct operation of the compiler 110 using its generated optimization control data.

Alternate embodiments of a computational environment 300 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 300 may include code 350 for implementing embodiments of the present invention as described herein.

It will be appreciated that various systems, including the systems described above in FIGS. 1-3, can be used to implement embodiments of the rule-based, automated optimization analysis techniques described herein. Some embodiments are further described according to the methods of FIG. 4. Where the methods are described in the context of specific system components, those descriptions are intended only for the sake of clarity and should not be construed as limiting the scope of any embodiments.

Figure 4:
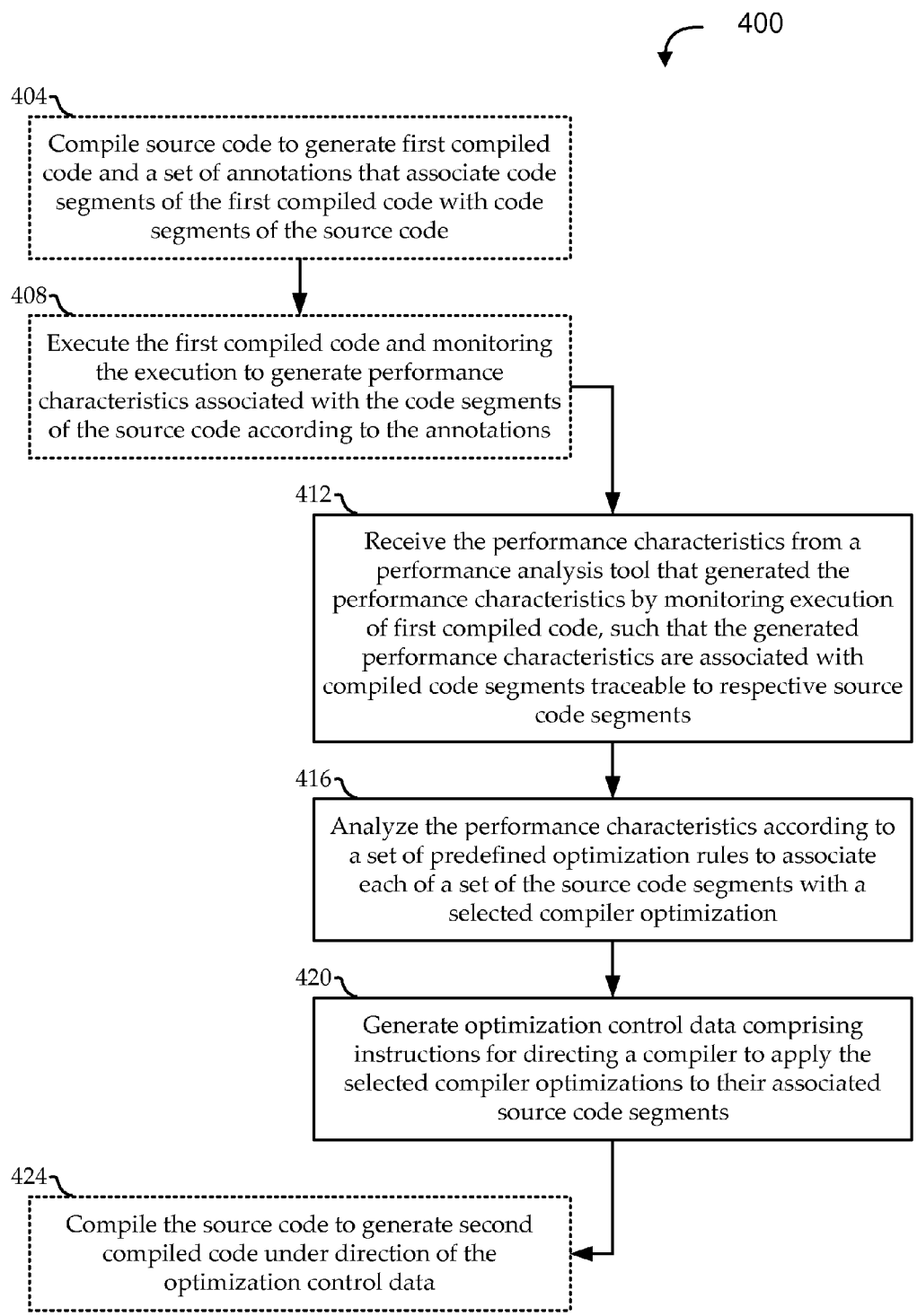
FIG. 4 shows a flow diagram an illustrative method for compiling using rule-based, automated optimization analysis, according to various embodiments.

FIG. 4 shows a flow diagram an illustrative method 400 for compiling using rule-based, automated optimization analysis, according to various embodiments. Some embodiments of the method 400 begins at stage 404 by compiling source code to generate first compiled code and a set of annotations that associate code segments of the first compiled code with code segments of the source code. As described above, the compiling can be a canonical compiling. For example, the canonical compiling can include disabling speculative compiler optimizations and performing non-speculative compiler optimizations using default (e.g., predetermined) parameters. The annotations can be generated in any suitable manner, for example as a section of the first compiled code.

At stage 408, embodiments can execute the first compiled code (e.g., with a computer-implemented performance analysis tool) and monitor the execution to generate performance characteristics associated with the code segments of the source code according to the annotations. In some implementations, the performance characteristics include execution statistics gathered during the execution using hardware counters. Any suitable performance characteristics can be gathered, including, for example, any of cache miss data, timing data, tick counter data, branch mispredict data, loop trip count data, Translation Lookaside Buffer (TLB) miss data, etc.

At stage 412, the performance characteristics can be analyzed according to a set of predefined optimization rules to associate each of a set of the code segments of the source code with a selected compiler optimization. The association with the source code segments can include first associating with a compiled code segment, then using the annotations to map the associated compiled code segment to a respective source code segment. In some implementations, the analyzing further associates at least some of the selected compiler optimizations with respective optimization parameters according to the performance characteristics and the set of predefined optimization rules. For example, each time one of the rules is triggered by performance data, an appropriate compiler optimization can be selected, associated with the triggering code segment, and further associated with an appropriate parameter (e.g., a "loop unrolling" optimization can be associated with a parameter of "4").

At stage 416, optimization control data can be generated to include instructions that each defines one of the selected compiler optimizations and its associated code segment of the source code. For example, a rule-based optimization analyzer (RUBOA) can generate a set of internal compiler options that correspond to each of the compiler optimizations selected in stage 412 in a format that can be used to direct operation of a compiler (e.g., read by the compiler, etc.). Alternatively, the RUBOA can generate a compiler-readable text file, a set of command line options, or any other suitable optimization control data. In some embodiments, the method can compile the source code (e.g., a second time) to generate second compiled code under direction of the optimization control data.

Some embodiments of the method 400 begin at stage 412 by receiving the performance characteristics. In such embodiments, the performance characteristics can be received from a computer-implemented performance analysis tool that generated the performance characteristics by monitoring execution of first compiled code, such that the generated performance characteristics are associated with compiled code segments traceable to respective source code segments (e.g., according to a set of annotations generated during compiling of the source code into the first compiled code). Such embodiments can, at stage 416, analyze the performance characteristics according to a set of predefined optimization rules to associate each of a set of the source code segments with a selected compiler optimization. Further, at stage 420, such embodiments can generate optimization control data including instructions for directing a computer-implemented compiler to apply the selected compiler optimizations to their associated source code segments. Some such embodiments can further compile the source code canonically to generate the first compiled code (e.g., as in stage 404), compile the source code to generate second compiled code under direction of the optimization control data (e.g., as in stage 424), etc.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A computer-implemented method for automated rule-based compiling optimization, the method comprising:
    first compiling source code to generate first compiled code and a set of annotations that associate code segments of the first compiled code with code segments of the source code, wherein the first compiling comprises canonically compiling the source code to generate the first compiled code, and wherein the canonically compiling comprises disabling speculative compiler optimizations and performing non-speculative compiler optimizations using default parameters;

executing the first compiled code and monitoring the execution to generate performance characteristics associated with the code segments of the source code according to the annotations;

analyzing the performance characteristics according to a set of predefined optimization rules to associate each of a set of the code segments of the source code with a selected compiler optimization;

generating optimization control data comprising instructions that each defines one of the selected compiler optimizations and its associated code segment of the source code; and second compiling the source code to generate second compiled code under direction of the optimization control data.

2. The method of claim 1, wherein the annotations are generated as a section of the first compiled code.

3. The method of claim 1, wherein the analyzing further associates at least some of the selected compiler optimizations with respective optimization parameters according to the performance characteristics and the set of predefined optimization rules.

4. The method of claim 1, wherein the performance characteristics comprise execution statistics gathered during the execution using hardware counters.

5. The method of claim 1, wherein the performance characteristics comprise at least two of cache miss data, timing data, tick counter data, branch mispredict data, loop trip count data, or Translation Lookaside Buffer (TLB) miss data.

6. The method of claim 1, wherein the optimization control data comprises internal compiler options in a format readable by a compiler to direct the second compiling.

7. The method of claim 1, wherein the analyzing and the generating optimization control data are performed by a rule-based optimization analyzer.

8. A computer-implemented method for automated rule-based compiling optimization, the method comprising:

receiving performance characteristics from a computer-implemented performance analysis tool that generated the performance characteristics by monitoring execution of first compiled code, so that the generated performance characteristics are associated with compiled code segments traceable to respective source code segments, wherein the first compiled code is generated by canonically compiling the source code, and wherein the canonically compiling comprises disabling speculative compiler optimizations and performing non-speculative compiler optimizations using default parameters;

analyzing the performance characteristics according to a set of predefined optimization rules to associate each of a set of the source code segments with a selected compiler optimization; and generating optimization control data comprising instructions for directing a computer-implemented compiler to apply the selected compiler optimizations to their associated source code segments.

9. The method of claim 8, wherein the compiled code segments are traceable to respective source code segments according to a set of annotations generated during compiling of the source code into the first compiled code.

10. The method of claim 8, further comprising:
compiling the source code to generate second compiled code under direction of the optimization control data.

11. The method of claim 8, wherein the analyzing further associates at least some of the selected compiler optimizations with respective optimization parameters according to the performance characteristics and the set of predefined optimization rules.

12. The method of claim 8, wherein generating the optimization control data comprises generating internal compiler options in a format readable by the computer-implemented compiler to apply the selected compiler optimizations to their associated source code segments.

13. A computer-implemented compiler system comprising:

at least one processor and memory structure;
a rule-based optimization analyzer that:
receives performance characteristics from a computer-implemented performance analysis tool that generated the performance characteristics by monitoring execution of first compiled code, so that the generated performance characteristics are associated with compiled code segments traceable to respective source code segments;

analyzes the performance characteristics according to a set of predefined optimization rules to associate each of a set of the source code segments with a selected compiler optimization; and generates optimization control data comprising instructions for directing a computer-implemented compiler to apply the selected compiler optimizations to their associated source code segments; and a computer-implemented compiler, communicatively coupled with the rule-based optimization analyzer, that canonically compiles the source code to generate the first compiled code, wherein the computer-implemented compiler canonically compiles the source code at least in part by disabling speculative compiler optimizations and performing non-speculative compiler optimizations using default parameters.

14. The computer-implemented compiler system of claim 13, further comprising:
a computer-implemented compiler, communicatively coupled with the rule-based optimization analyzer, that compiles the source code to generate second compiled code under direction of the optimization control data.

15. The computer-implemented compiler system of claim 13, further comprising:
the computer-implemented performance analysis tool.

* * * * *